Dec. 2, 1958   R. T. LUEDEMAN   2,862,844
COMPOSITE BRAZING MATERIAL
Filed Dec. 9, 1954

INVENTOR
ROBERT T. LUEDEMAN
BY Rudolph J. Jurick
ATTORNEY

United States Patent Office 2,862,844
Patented Dec. 2, 1958

2,862,844

COMPOSITE BRAZING MATERIAL

Robert T. Luedeman, Leonia, N. J., assignor, by mesne assignments, to Daystrom, Incorporated, Murray Hill, N. J., a corporation of New Jersey Application December 9, 1954, Serial No. 474,208

5 Claims. (Cl. 148—24)

This invention relates to a composite brazing material and more particularly to a brazing material for use where a hard facing surface is to be applied to metal parts or a corrosition resistant weld is desired.

Certain corrosition resistant or hard facing brazing alloys for this purpose, for example, "Colmonoy #6," consist of > 65–75% nickel
> 13–20% chromium
> 2.75–4.75% boron
> 10% max. iron, silicon and carbon Such alloys are extremely brittle and they are generally used in the form of finely crushed powder. A disadvantage of the prior material is that some device must be employed to retain the powder in place during the heating of parts which are to be united or coated, thus limiting the design or shape of such parts. Another disadvantage is that the powder cannot be used in a nitrogen atmosphere as nitrogen contaminates the powder. Such alloys are generally used to braze stainless steel parts but the iron, silicon and carbon are not essential for the production of a good joint and may be considered in the nature of impurities which are only incidentally present.

An object of this invention is the provision of a composite brazing material for use in place of the known nickel-chromium-boron alloys and which is more convenient to use.

An object of this invention is the provision of a brazing material for use with stainless steel and which is not detrimentally affected by air or nitrogen.

More specifically, an object of this invention is to provide a composite brazing material or welding rod in the form of a nickel tube filled with powdered chromium boride to which, if a lower initial melting point is desired, a small amount of powdered nickel-chromium-boron alloy may be added.

These and other objects and the advantages of the invention will be apparent from the following specification when taken with the accompanying drawing, in which:

Figure 2 is an enlarged end view presentation of a nickel tube filled with powdered material before it is rolled or drawn to desired size and cross-section; and Figure 3 is a fragmentary perspective view of a composite brazing material rod ready for use.

Figure 1:
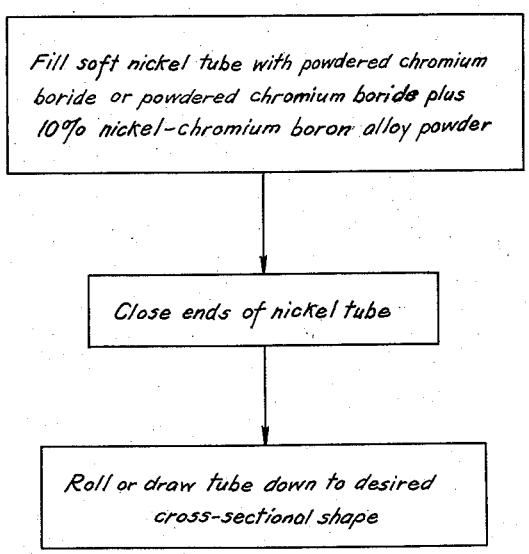
Figure 1 is a flow sheet illustrating the method of manufacture of composite brazing material embodying the invention.
Figure 1:
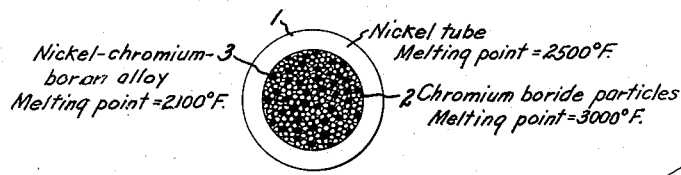
Figure 1:
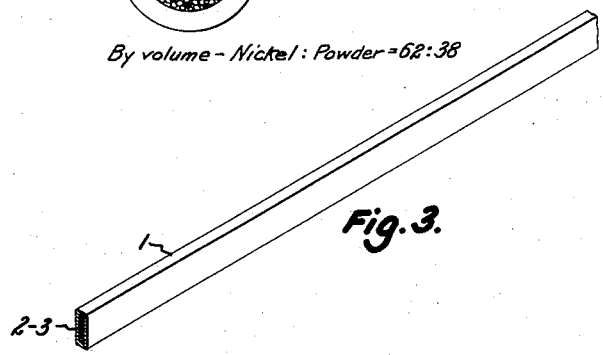

As indicated in Figures 1 and 2, the essential elements of the composite brazing material are a soft or ductile nickel tube filled with powdered chromium boride, the tube diameter and wall thickness being such that the ratio of the volume of nickel to the powdered contents is about 62:38. The ends of the filled tube are closed by crimping, or preferably by brazing, and the tube is then worked, that is, drawn or rolled down to a convenient size and cross-section for use, for example in a welding gun. This operation does not alter the ratio of nickel to powder throughout the length of the resulting smaller size tube but the powder is firmly compacted within the tube so that little or no powder is lost when the tube is cut into desired lengths for use.

As shown in Figure 2, about 10% of the chromium boride may be replaced by a nickel-chromium-boron alloy, for example powdered Colmonoy #6 alloy, to reduce the melting point of the brazing material below the melting point of nickel (2,500° F.) and of chromium and boron (3,000° F.). The standard Colmonoy alloy melts at about 2050–2100° F. and acts as a "starter," and the brazing temperature for the combination is thus lower than that which would melt the nickel tube or the chromium boride (3,000° F.) if they were separately heated.

The invention provides a brazing material in a form which may be used in welding guns and which has the further advantage that the nickel tube protects the chromium boride from contamination by nitrogen during storage and the heating-up portion of the brazing cycle. The actual alloy is not formed until the melting of the tube and its contents, and this takes place precisely at the joint of the parts to be united.

While presently preferred proportions for the components of the brazing material have been specified, it is to be understood that small departures therefrom may alter the melting point of the composite material but fall within the scope of the invention as set forth in the following claims.

Having given a description of my invention in accordance with the requirements of the Patent Statutes what I desire to protect by Letters Patent of the United States is set forth in the following claims.

I claim:

1. Composite brazing material consisting essentially of nickel tube filled with a mixture of powdered chromium boride and a powdered nickel-chromium-boron alloy having a melting point of about 2050–2100° F., the mixture being in the ratio of about 90 parts of chromium boride to 10 parts of the alloy.

2. Composite brazing material as recited in claim 1, wherein the filled tube is compacted to minimize loss when cut into desired lengths.

3. Composite brazing material as recited in claim 1, wherein the ratio by volume of nickel to powdered mixture is about 62:38.

4. Composite brazing material consisting essentially of a nickel tube filled with powdered chromium boride, wherein the ratio by volume of nickel to the powdered boride is about 62:38.

5. Composite brazing material as recited in claim 4, wherein the filled tube is compacted to minimize loss when cut into desired lengths.

References Cited in the file of this patent

UNITED STATES PATENTS

| | | |
|---|---|---|
| 1,977,128 | Hawkins | Oct. 16, 1934 |
| 1,999,888 | Ammann | Apr. 30, 1935 |
| 2,137,471 | Zublin | Nov. 22, 1938 |